United States Patent [19]
Sweeney, Jr.

[11] Patent Number: 4,810,946
[45] Date of Patent: Mar. 7, 1989

[54] ADAPTIVE PULSING MOTOR CONTROL FOR POSITIONING SYSTEM

[75] Inventor: James S. Sweeney, Jr., Laguna Beach, Calif.

[73] Assignee: Unisen, Inc., Irvine, Calif.

[21] Appl. No.: 439,299

[22] Filed: Nov. 4, 1982

[51] Int. Cl.⁴ .......................................... G05B 13/00
[52] U.S. Cl. .................................. 318/561; 318/594; 318/611; 364/176; 364/182; 364/167.01
[58] Field of Search ............... 318/594, 561, 599, 611, 318/592–593, 595, 590, 616, 603; 364/170, 176, 182

[56] References Cited

U.S. PATENT DOCUMENTS

| | | | |
|---|---|---|---|
| 3,223,830 | 12/1965 | Evans | 318/594 X |
| 3,411,057 | 11/1968 | Knight | 318/594 |
| 3,555,252 | 1/1971 | Garden | 318/561 X |
| 3,700,379 | 10/1972 | Robertson | 318/561 X |
| 3,944,902 | 3/1976 | Lacorre | 318/594 X |
| 4,287,461 | 9/1981 | Promis | 318/603 X |
| 4,312,033 | 1/1982 | Sweeney | 318/594 X |
| 4,315,199 | 2/1982 | Kyomasa | 318/603 X |
| 4,340,848 | 7/1982 | Hanagata | 318/561 |
| 4,353,019 | 10/1982 | Sweeney | 318/594 |
| 4,404,508 | 9/1983 | Nishida | 318/611 |

Primary Examiner—Benjamin Dobeck
Attorney, Agent, or Firm—Thomas J. Plante

[57] ABSTRACT

A machine positioning apparatus and method are disclosed in which motor control values are established by causing intentional overshoot of the destination, and automatically reducing the motor control values each time an overshoot occurs. The system disclosed is a three stage system in which: (1) the first stage is a continuation motion relatively fast stage wherein the motor control values relate to the distance traveled; (2) the second stage is a much slower stage in which a series of interim targets are set, each of which is at a distance from current position which is a fraction of the remaining distance to destination, the motor control values during the second stage being motor duty cycle values; and (3) the third (final) stage is the slowest and involves setting a series of interim targets to be passed, each of which is substantially the current position, the motor control values during the third stage being motor duty cycle values.

34 Claims, 5 Drawing Sheets

ADAPTIVE PULSING MOTOR CONTROL FOR POSITIONING SYSTEM

BACKGROUND OF THE INVENTION

This invention relates to an adaptive pulsing system for controlling a motor which moves a device to a desired position. The invention is useful wherever it is desired to have precise position control, i.e., very accurately determined movement to destination.

In abandoned Sweeney appliction Ser. No. 289,922, filed Aug. 4, 1981, and assigned to the assignee of this application, a positioning system is disclosed utilizing a synchronous pulsing system which varies the energy exerted during a predetermined "on" period. In other words, the motor "on" portion of each cycle is a predetermined "window", or period, of time; and the motor "off" portion of each cycle is also a predetermined period of time, the two periods having a ratio which depends on the type of machine being operated. Within the "on" window, a "nudging" technique is used during final approach to move the driven element by providing initially a lesser amount of energy during the period of one "on" window, and gradually increasing the amount of energy during each successive "on" window, until forward movement is detected. Then the cycle begins again with the lesser amount of energy. Thus, the duration of the actuation period ("on" window) is constant, but the driving energy is varied within the "on" window. This variation preferably is accomplished by varying the duty cycle of the motor. And the preferred way of causing the duty cycle variation is to provide motor driving pulses whose width is varied to alter the ratio of "on" and "off" time within the "on" window.

In both Ser. No. 289,922 and its predecessor application, Sweeney application Ser. No. 173,274, which is now U.S. Pat. No. 4,353,019, and which is also assigned to the assignee of this application, the final, or terminal, approach to the destination is accomplished by the aforementioned "nudging" technique, in which pulses providing successively increasing amounts of motor-driving energy are used until forward motion of the driven element is detected, at which time the driving pulse cycle starts again at the lowest value. This concept of a repetitive pulse-increasing cycle as the terminal pulsing approach, which would seem to be contraindicated by prior art teachings, has in fact demonstrated the ability to accomplish previously unattainable position accuracy.

In an earlier application of Sweeney et al, now U.S. Pat. No. 4,312,033, a destination-finding "proportional" technique is disclosed in which each interim target in a series of targets is set as a fraction of the remaining distance to destination. While the techniques disclosed in the later-filed applications have proved successful in attaining improved resolution, the system of U.S. Pat. No. 4,312,033 is still useful as a stage in the motion of the driven element just prior to the final "nudging" stage. Also, it is clearly useful to have an initial, fast motion stage which brings the driven elements to the vicinity of the destination, before the "proportional" and "nudging" stages are initiated.

It has now been perceived that a lack of optimization in all of the earlier approach systems has resulted from the preoccupation with avoiding destination overshoot at all costs. In other words, unnecessarily complicated systems, and systems which move more slowly than necessary, have resulted from an over-concern with the overshoot possibility. The present system is designed to convert the overshoot potential from a negative to a positive factor in the destination-finding system.

The present invention is concerned primarily with the automatic adjustment or "revaluation" of the quantitative values used in destination-finding systems similar to those of the applications identified above, i.e., such initial values as the duty cycle which begins each series of duty cycle changes, and the position to which the system is driven in its initial rapid motion phase. In the systems of the previous applications, it was necessary to pre-select those values; and the initial values were set low enough to avoid overshoot. If the values were set too high, overshoot would be unavoidable, and repetitive. If, to counteract that possibility, the initial values were set very low, then an unnecessarily complicated and slow approach to destination would result.

The operating characteristics of positioning machines, i.e. the energy required to move them, will differ because of several variables, such as their mechanical characteristics, the loads they encounter in different situations, and the quality of their maintenance. Also different axes of the same machine may have different operating characteristics. As stated above, in prior machines of the type discussed herein, it has been necessary to set low initial values of target position and/or driving energy because, otherwise, the machine would tend to overshoot frequently, and therefore be unreliable.

SUMMARY OF THE PRESENT INVENTION

The present invention provides an overshoot correction system which removes the criticality of machine operating value selection. In the preferred version it causes intentional overshoot in order to obtain relatively optimal operating values. The invention provides an automatic revaluation process for a position-seeking system, wherein the initial driving energy (or target position) value is set high enough to cause initial overshoot, and is then gradually reduced until it no longer overshoots. And the reduced value reached by the initial value-decreasing cycle is then retained in the memory of the system and used as the initial value for subsequent operations of the machine. By pushing a reset button, the operator can cause automatic revaluation by the machine if, at any time, it appears that the initial driving energy value (or target position) is no longer optimum.

This "initially compensated overshoot" can be used very successfully in all phases of the movement of the driven element toward its final destination. For example, it can be used in each phase of a three-phase position approach system, including: (1) a continuous (high duty cycle) motor-driving phase for fast approach; (2) a proportional approach phase, such as that disclosed in Sweeney et al U.S. Pat. No. 4,312,033; and (3) a final "terminal pulsing", or "nudging", phase such as that disclosed in Sweeney U.S. Pat. No. 4,353,019 and application Ser. No. 289,922. In the first of the three phases, initial overshoot may be caused by the setting of the initial target position, which is then automatically adjusted to prevent overshoot. In the second and third phases, initial overshoot may be caused by setting a relatively high duty cycle for the motor, which is then automatically adjusted downwardly to prevent overshoot.

This revaluation, or setting, of the basic values in the system by means of an initially caused overshoot, followed by an adaptive reduction of those values, permits automatic selection of near-optimum operating values in the system, and eliminates some of the complexities described in the previous systems.

BRIEF DESCRIPTION OF THE DRAWINGS

FIG. 1 is a diagrammatic showing of a control system for a multi-axis positioning machine; and FIG. 2 is a diagrammatic showing of the control circuitry for one axis of the system of FIG. 1; and FIGS. 3–7 show various portions of the flow chart illustrating operation of the present invention, FIG. 3 showing the general operation of the system, whereas FIGS. 4–7 show subsystems which represent subroutine blocks included in FIG. 3.

DETAILED DESCRIPTION OF PREFERRED EMBODIMENT

Figure 1:
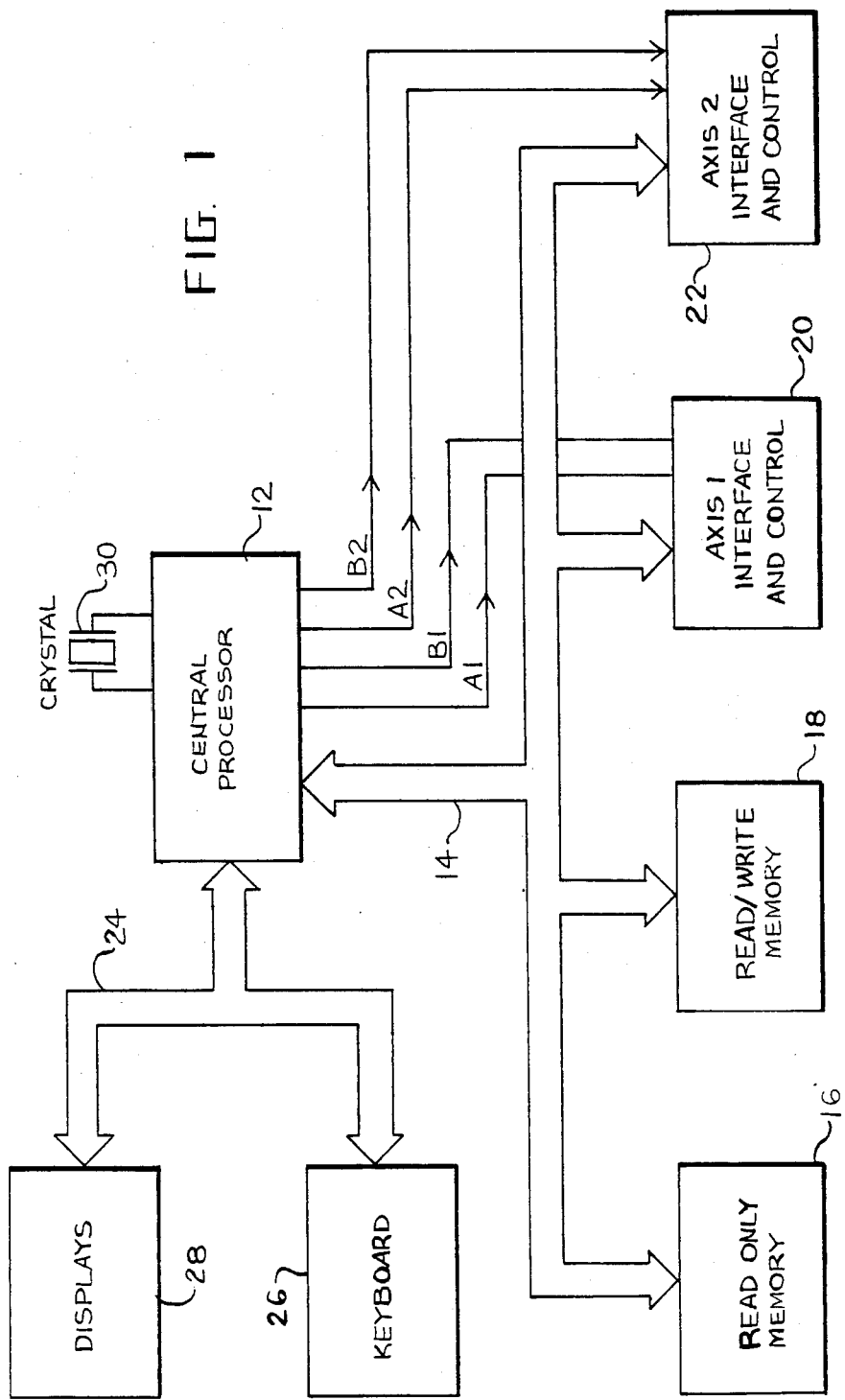
FIGS. 1 and 2 are identical, respectively, with FIGS. 1 and 2 of application Ser. No. 289,922.
Figure 2:
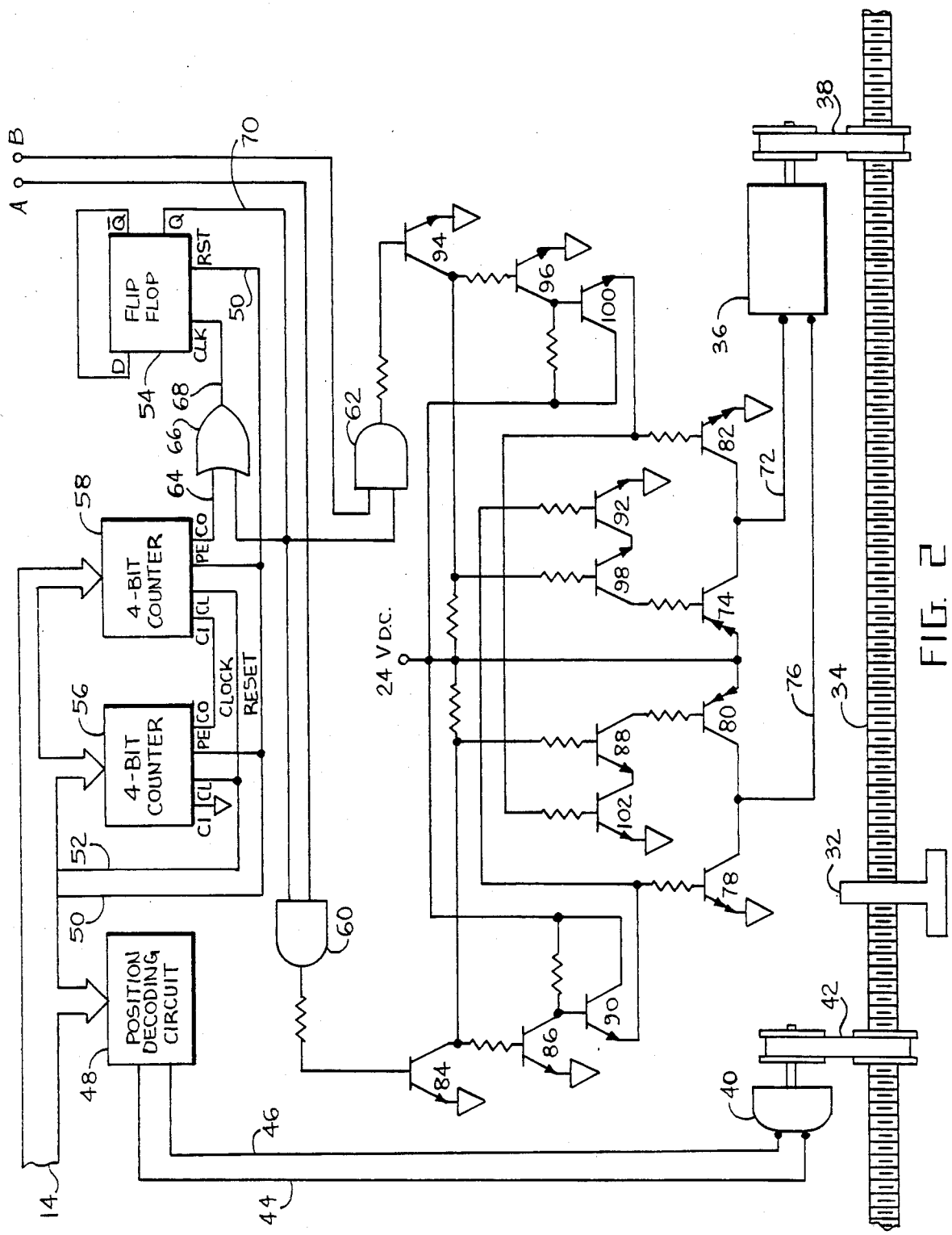

The following description of the mechanism of FIGS. 1 and 2 substantially copied from the description of the same drawings in application Ser. No. 289,922. While other systems could be successfully substituted for that of FIGS. 1 and 2, it has operated successfully in a variety of installations, and provides an adequate basis for explaining the improvements covered by the present application.

FIG. 1 shows the general system, which preferably is microcomputer controlled. A central processor (CPU) 12 is programmed to provide the desired sequencing of events and is in electronic communication, via bus 14 (which includes data, address and control signals), with a read-only (or program) memory 16, a read/write memory 18, an interface/control 20 for the first axis, and an interface/control 22 for the second axis. The CPU 12 also is connected by a bus 24 to a keyboard 26 and to displays 28. The read/write memory stores program variables and sequences of positions; and the keyboard is used for entry of destination positions. The fundamental frequency utilized by the clock of CPU 12 may be established by a crystal 30.

Each axis of the system has a variable duty-cycle circuit which controls motor speed, and two signal inputs which control direction and dynamic braking. In FIG. 1, the two signal inputs from the CPU 12 to the first axis are leads A1 and B1; and the two signal inputs from the CPU 12 to the second axis are leads A2 and B2. The signal inputs from the CPU on these lines establish the ratio of the on window period to the off period during the final approach phase.

FIG. 2 provides a diagram of the control circuit for each axis of the system. The end result is controlled motion and precise destination-positioning of a driven element symbolically shown at 32, which may represent any of numerous elements which require precise positioning. Among the intended uses of the present invention are positioning of the lens and film planes of cameras, of the chases of step-and-repeat machines, or of the tables of drilling machines or milling machines. While the present invention is particularly useful in multi-axis systems, it is also applicable to single-axis systems. Although most uses will favor final destination approach, or "settling in," from one direction only, it is entirely practicable to provide final approach from both directions, as is desirable in step-and-repeat machines.

It is generally considered convenient to move the driven element 32 by means of a lead screw 34, which may be rotated by an electric motor 36 operatively connected to the lead screw by a gear belt 38. Obviously numerous other drive systems could be substituted. It is possible that a motor driven by other than electric power could be used. However, an electric motor, and specifically a permanent-magnet DC motor, is preferred.

The position of the driven element may be conveniently sensed for feedback to the control electronics by a shaft encoder 40 (preferably an incremental encoder), which may be operatively connected to the lead screw 34 by a gear belt 42. The position signals from the shaft encoder 40 are conveyed by lines 44 and 46 to a position decoding circuit 48, which accumulates a count representing the position of the driven element 32, and which is in communication with CPU 12 via bus 14.

The control system preferably is designed to provide a three-stage approach to destination: (1) a first fast, continuous motion stage, (2) a second "proportional" stage, and (3) a final "nudging" stage. These terms will be discussed in detail below.

The ability to vary the duty cycle of the motor is a fundamental factor in the system. Also, in the final stage, it is important to use the concept of an "on" window which permits the motor to operate for a certain period, which is a percentage of the total motor on/off cycle. During the "on" window period, the motor duty cycle is subject to variations for control purposes.

The control portion of the system includes four control lines from the CPU 12. In addition to the A and B lines, previously mentioned, a reset line 50 and a clock line 52 are required. The reset line 50 is connected to a counter and to a flip-flop 54. The counter is an 8-bit counter provided by combining two 4-bit counters 56 and 58, each communicating with CPU 12 via bus 14. The reset line 50 is connected to the preset enable inputs of each of the counters 56 and 58, and to the reset input of flop-flop 54. The clock line 52 is connected to the clock inputs of each of the counters 56 and 58. The carry in of counter 56 is grounded, and the carry out of counter 56 is connected to the carry in of counter 58.

The direction control lines A and B are connected to AND gates 60 and 62, respectively. The carry out of the 8-bit counter is an input via line 64 to an OR gate 66, whose output is connected by line 68 to the clock input of flip-flop 54. The $\overline{Q}$ output of flip-flop 54 is tied to its Data (D) input. The Q output of flip-flop 54 is an input via line 70 to both AND gates 60 and 62, and also to OR gate 66. The two AND gates 60 and 62 provide controlling signals to the motor 36 through the intermediary of a suitable motor drive circuit, which operates according to the logic of this truth table:

|  | A = 0 | A = 1 |
|---|---|---|
| B = 0 | off | forward |
| B = 1 | reverse | braking |

As shown in FIG. 2, motor 36 will run in the forward direction of 24 V is supplied to lead 72 via Darlington 74, and ground is supplied to lead 76 via Darlington 78. The motor will run in reverse when lead 76 receives 24 V from Darlington 80 and lead 72 is grounded via Darlington 82. Dynamic braking is accomplished if both leads are shorted together to ground via Darlingtons 78 and 82. If all Darlingtons are off, the motor is in an off state.

Transistors 84 through 102 provide the logical interfacing between the AND gates 60 and 62 and the Darlingtons. Consider the case in which A=1, B=0, and the Q output of flip-flop 54 is 1. The output of AND gate 60 is 1, turning on transistor 84, which then turns off transistors 86 and 88. Turning transistor 86 off activates transistor 90, which turns on Darlington 78, providing ground to motor lead 76. Transistor 90 also turns on transistor 92. The output of AND gate 62 is 0, so that transistor 94 is off, causing transistors 96 and 98 to be on, and transistors 100, 102 and Darlington 82 to be off. Since both transistors 92 and 98 are on, Darlington 74 is turned on, supplying 24 VDC to motor lead 72, thereby causing motor 36 to move in the forward direction.

It will be seen from the symmetry of the circuit that, when B=1 and A=0, Darlingtons 80 and 82 will be turned on, and the motor will run in the reverse direction.

The following is a table of transistor states as a function of the states of the A and B lines.

| A = 0 | A = 1 | B = 0 | B = 1 |
|-------|-------|-------|-------|
| 84 off | 84 on | 94 off | 94 on |
| 86 on | 86 off | 96 on | 96 off |
| 88 on | 88 off | 98 on | 98 off |
| 90 off | 90 on | 100 off | 100 on |
| 92 off | 92 on | 102 off | 102 on |
| 78 off | 78 on | 82 off | 82 on |

Darlington 80 is on if 102 and 88 are on (A=0, B=1); Darlington 74 is on if 92 and 98 are on (A=1, B=0).

Other electronic circuitry may be used in controlling the motion of motor 36, but the disclosed circuitry is particularly simple, cost-effective and rugged for fractional horsepower motors operating in the region of 24 volts.

The circuitry which determines the amount of energy applied the period of the on window also may be selected from a number of options. The arrangement disclosed is considered relatively cost-effective. In the experimental system, the counters 56 and 58 are CMOS 4-bit presettable binary counters, and the flip-flop 54 is a D-type flip-flop. The purpose of the circuit is to provide a pulse train whose duty cycle is proportional to an 8-bit value provided by the CPU 12. The counter is run in its "up" mode so that, upon counting up to its full count of 255, it generates a carry-out pulse on its CO pin and starts counting up again from zero. In the configuration shown in the drawing, the count increments at the clock frequency.

As shown, the $\overline{Q}$ output of flip-flop 54 is tied to the D input so that at each clock transition the Q output changes state. The gate 66 ORs together the CO output of the counter and the Q output of the flip-flop so that, once the flip-flop has set its Q output to 1, no further transition can occur on its CLK input until after a reset. The clock signal is generated by the computer for various purposes; it is 400 kHz as it leaves the CPU, and is divided down to give the lower frequency. The reset signal is generated once every 256 clock cycles (at half the display refresh rate); it resets the flip-flop and presets the counter to the 8-bit value present on the data bus. The computer sees this as "writing" the value to the counter, as if it were a location in memory.

The A and B signals provide direction and on/off logic. When a signal is present on A or B and while a 1 is present at the Q output of the flip-flop, a 1 will be present at the output of one of the two AND gates, and current will flow through the motor. In establishing the overall relation of on window time to off time of the motor, i.e., the percentage of total time during which the on window permits motor actuating energy to be exerted, the CPU 12 is controlling the true or false signal on either line A or line B to the motor control circuit. If the axis under control is moving in the forward direction, the line on which a true, or positive, signal appears during the on window period is line A.

The sequence of operations is as follows: the RESET signal resets the flip-flop to the off state (Q=0, $\overline{Q}$=1) and presets the counter to the value output from the computer. The counter counts from its preset value to 255, then generates a carry-out pulse, which triggers the flip-flop to its on state (Q=1). If a 1 is present on A (or B), then a 1 will be present at the output of AND gate 60 (or 62), and the motor circuit will operate. If the preset value is 255, the motor will be off during one clock period, after which the flip-flop will be triggered, turning the motor on (assuming A or B is present). The motor remains on for the remaining 255 clock periods and is turned off at the next reset. This gives a 99.6% duty cycle, which is the maximum attainable. If the preset value is 128, the motor is off for 128 clock periods, then on for 128 clock periods—a duty cycle of 50%. At a preset value of 64, the motor is off for 192, on for 64, a 25% duty cycle.

The electronic position control system of FIG. 2 is, as previously stated, for one axis only. Each axis requires its own control system, i.e., an additional motor, lead screw, encoder, position decoding circuit, reset line, motor drive circuit, and direction control lines. The clock signal may be common to all axes. If a multi-axis system is used, the CPU 12 coordinates actuation of the axes, and prevents any conflicting demands from occurring.

The following description is directed specifically to the present invention. Although the three phase operation mentioned in the Summary of the Invention is not necessary, it has proved very successful. In the first phase, motor 36 and driven element 32 are caused to have rapid, continuous movement until the latter reaches a certain position. In the present invention, the driven element, during system revaluation, i.e., during "set-up" of the system, may be intentionally moved beyond its destination, i.e., may be caused to overshoot ("overshoot" being defined as movement past destination; and "destination" being defined as the final desired position of the driven element). This intentional overshoot is caused by the selection of the initial target of the first phase movement ("target" being defined as the interim position to which the driven element is being moved during the current portion of its controlled motion). From data acquired during the initial overshoot, a new target-setting value is automatically determined, and stored in the computer memory. The motor is then driven in reverse to return the driven element to the "settling-in" side of the destination. On this reverse movement, the target position is the destination (which was overshot). Because the motor will be cut off as soon as the destination point is passed on the way back, the driven element in reverse will probably not coast far enough from the destination to cause a re-actuation of the first phase, i.e., the rapid, continuous motion phase. However, the target-setting value of the first phase will have been recalculated and stored in the computer memory (the nonvolatile read/write memory), in order to make overshoot less likely during subsequent runs of the machine. If, during any run of the machine thereafter, the destination is again overshot, a further target position recalculation will automatically be made and stored in the computer. This will cause the target during the first phase to be set a greater distance short of the destination. In other words, the initial set-up is intended to permit maximum travel in the fast speed mode without causing overshoot; but, if overshoot should occur, there will be an automatic adjustment, or revaluation, to turn the motor off sooner on the next run.

In the second phase of settling-in motion, which preferably follows the "proportional", concept of U.S. Pat. No. 4,312,033, a target position is set which is a fraction of the remaining distance to destination. During system revaluation, or set-up, the motor is the second phase is first driven at a relatively high duty cycle which also may be set to cause intentional overshoot. Overshoot during the second phase usually occurs several times. After each such overshoot, the duty cycle for the second phase is incremented downwardly, and the new value is stored in the computer. The motor is then moved in reverse back to the settling-in side of the destination, in order to make another approach. In this second phase, it is the intention to use the highest value duty cycle which will not cause overshoot; but, if overshoot later occurs, there will be automatic downward adjustment, or revaluation, of the duty cycle, so that it will have a lower value on the next (and future) runs. During this second, or "proportional" phase, provision is made for automatically "ramping up", i.e., increasing, the duty cycle if the current target is not reached during one clock period (50 ms) of motor operation. Even though the basic (stored) duty cycle value in the "proportional" phase may have been reduced substantially during revaluation, a need to raise the duty cycle during a given increment of movement to the interim target may occur because of greater resistance to movement or because the distance to the interim target is greater (given the starting position of the particular increment.) However, such a duty cycle increase during one increment of target-seeking will not alter the stored duty cycle value which begins the next "proportional" increment of target-seeking.

In the final, or "nudging", phase of settling-in motion, the concepts of applications Ser. Nos. 173,274 and 289,922 are used, in which any motion beyond the interim target position causes a new interim target to be set until destination is reached. In the later application, a cycle of gradually increasing duty cycles is used to energize the motor until motion past the interim target is detected. If the initial duty cycle value in each such cycle of increasing values is set too low, a large number of increments may be required in each cycle. In order to reduce the number of incremental changes required in each cycle, the present invention, during system revaluation, or set up, begins the first cycle with a relatively high duty cycle, in order to cause intentional overshoot. Such overshoot usually occurs several times during revaluation. After each such overshoot, the duty cycle for the third (final) phase is incremented downwardly, and the new value is stored in the computer. As in both of the previous phases, after each overshoot the motor is actuated in reverse to move the driven element back past the destination. As in the case of the second phase, the purpose of intentional overshoot in the revaluation of the third phase is to start with the highest duty cycle value which will not cause overshoot; but, if overshoot later occurs, there will be automatic downward adjustment, or revaluation, of the duty cycle value which begins each "nudging" cycle during the next (and future) runs. In the final, or "nudging phase", provision is made for increasing the duty cycle during the on window period until target-passing occurs. The next increment of target-passing effort will start with the lower duty cycle set by the automatic revaluation process.

Once the revaluation process has established optimum values, operations of the machine will continue to be controlled by those values. However, the operator can cause the revaluation process to be repeated at any time, if he believes that altered operating conditions may have changed the values required for optimum performance.

Figure 3:
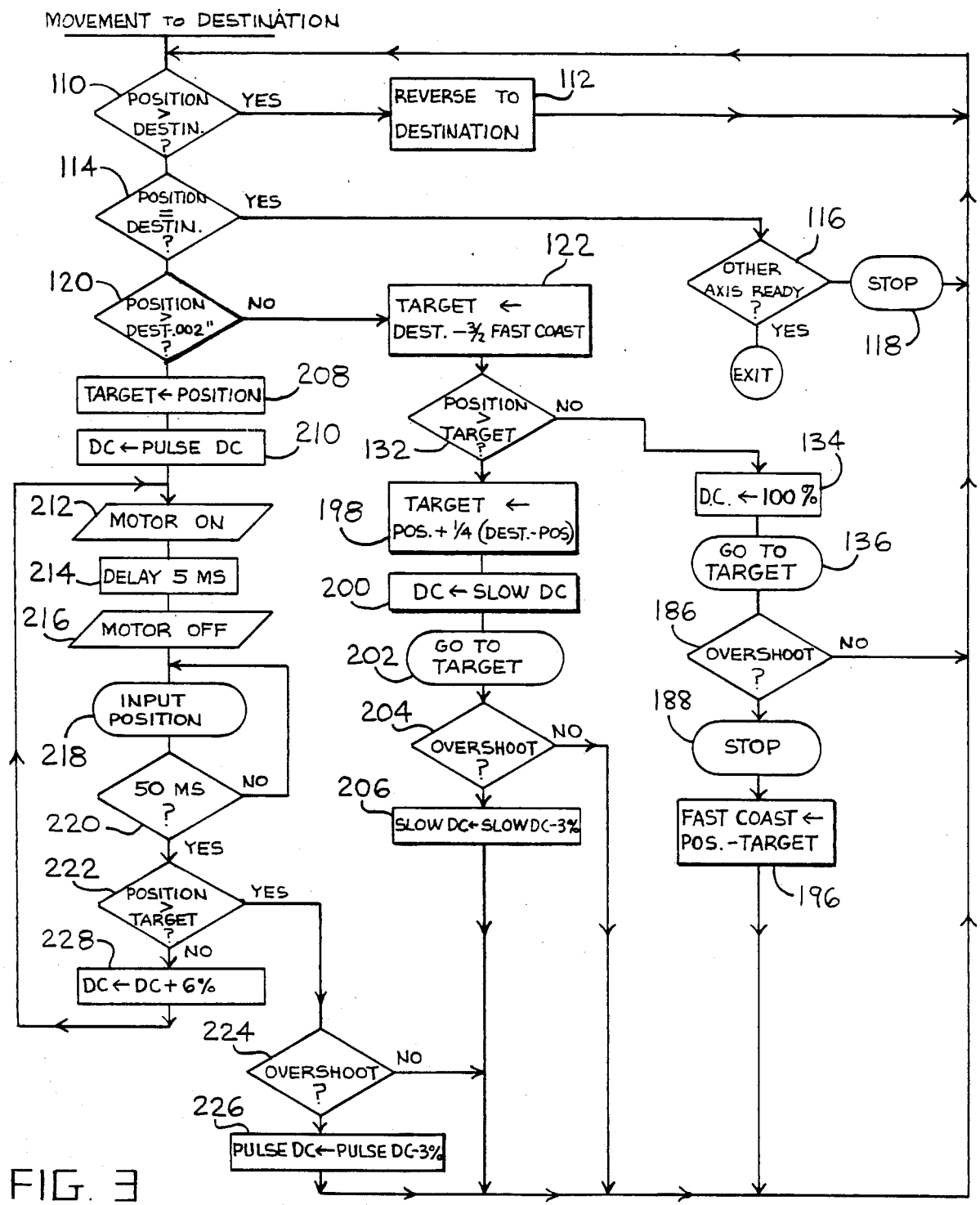

FIG. 3 shows the overall flow chart necessary to understand the invention. It is headed "Movement to Destination", and shows the operation in either axis of what is assumed, for illustrative purposes, to be a two-axis machine. In a decision block 110, the determination is made whether the driven element has passed the destination. If the answer is "yes", the motor will automatically reverse, as shown by process block 112, and move the driven element back past destination; and the flow chart process will loop back to the top. The target position during this reverse motion is set as the destination, and a "hard stop" is called for, once the target has been reached. The term "hard stop" is used to designate a substantially complete stop, which is distinguished from a "fast stop" ending the first phase of operation. In the preferred system, a "hard stop" is considered to have occurred when there is no detected motion during one complete clock cycle of the motor, which has been allocated a 50 ms period; a "fast stop" is considered to have occurred when the detected motion during a complete 50 ms clock period of the motor indicates a speed less than 50% of the speed during the last 50 ms period before motor turn off.

If the current position is not greater than destination at block 110, it will be determined at block 114 whether it is equal to destination. If so, the question will be asked at block 116 whether both axes have reached the destination. If they have, the process moves to exit, with the driven element at the desired position. If not, the flow chart process will take the hard stop subroutine shown by block 118, and then loop back to the top.

If the answer at both blocks 110 and 114 is "no", the driven element is short of the destination. At decision block 120 it is determined whether current position is greater than "destination minus 0.002 inch", i.e., is current position less than 0.002 inch short of the destination? If the answer is "no", the next target position is set at process block 122 to equal "destination minus 3/2 fast coast".

Figure 4:
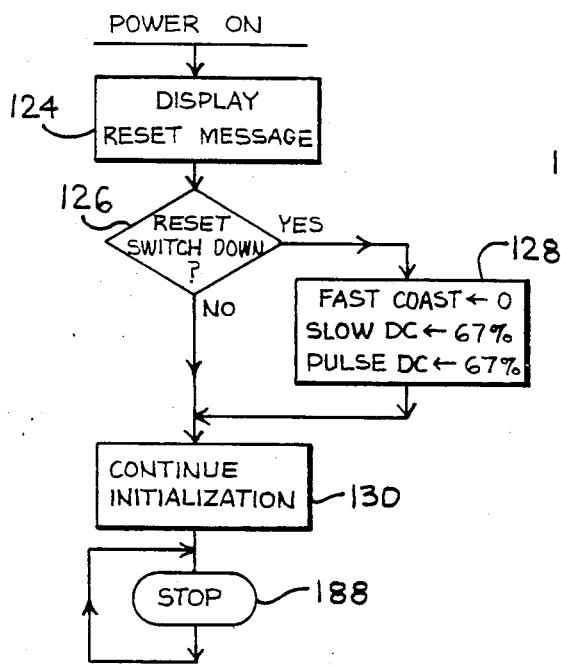

At this point, it is necessary to consider FIG. 4, which shows the flow chart subroutine relating to the initialization loop of the machine. The figure is headed "Power On", and begins with a standard process block 124 titled "display reset message". The next block is a decision block 126 which asks whether the "reset switch" is down. This switch, not to be confused with any reset functions shown in FIG. 2, is controlled by the operator to cause revaluation, when desired, of the operating values in the system. If the switch is not held down, the values previously stored in the computer will be used. However, if the switch is being held down, the values will be subject to the revaluation process which involves the intentional overshoot. This revaluation process preferably applies to all three stages of movement to destination.

As shown at process block 128, if the reset switch is being held down, the three initial values needed for the respective phases of machine travel are established by setting the "fast coast" value at zero, setting the "slow" duty cycle (DC) at approximately 67%, and setting the "pulse" duty cycle (DC) at approximately 67%. It is coincidental that the initial duty cycle values selected are the same for the slow duty cycle, which is used in the second, "proportional", phase, and the pulse duty cycle, which is used in the final, "nudging" phase. Experience has indicated that these values are adequately high for all installations. The percentage of motor "on" time to motor "off" time is not the same in the second and third phases, because the third phase has an on window period which is a small fraction (10%) of the 50 ms clock period. The percentage of motor "on" time to motor "off" time in the second phase is a function of the coasting time after motor turn off. The precise percentage amounts of the duty cycle values will be determined by the most appropriate fraction, using the available binary values. The smallest increment of variation available is 1/256.

Setting the values shown in block 128 erases any previously stored values of the corresponding items. The significance of these initial values will be fully discussed below. As shown at process block 130, whether or not the values in block 128 are substituted for those previously stored in the computer, the normal initialization process, which occurs whenever the power is turned on, will continue until completed, after which a hard stop will occur.

Since process block 122 in FIG. 3 sets the next target as "destination minus 3/2 fast coast", and assuming "fast coast" has been set at zero in process block 128, the initial target, for the first, rapid motion phase, is set as the destination. This creates intentional overshoot, because some coasting will occur after the motor is turned off. From block 122 the process flow is to decision block 132, which asks whether the current position is greater than target. Since it is assumed that no forward motion has yet occurred, the answer will be "no", and the duty cycle (DC) will be set at substantially 100% in process block 134. This will cause the motor to operate at top speed.

Figure 5:
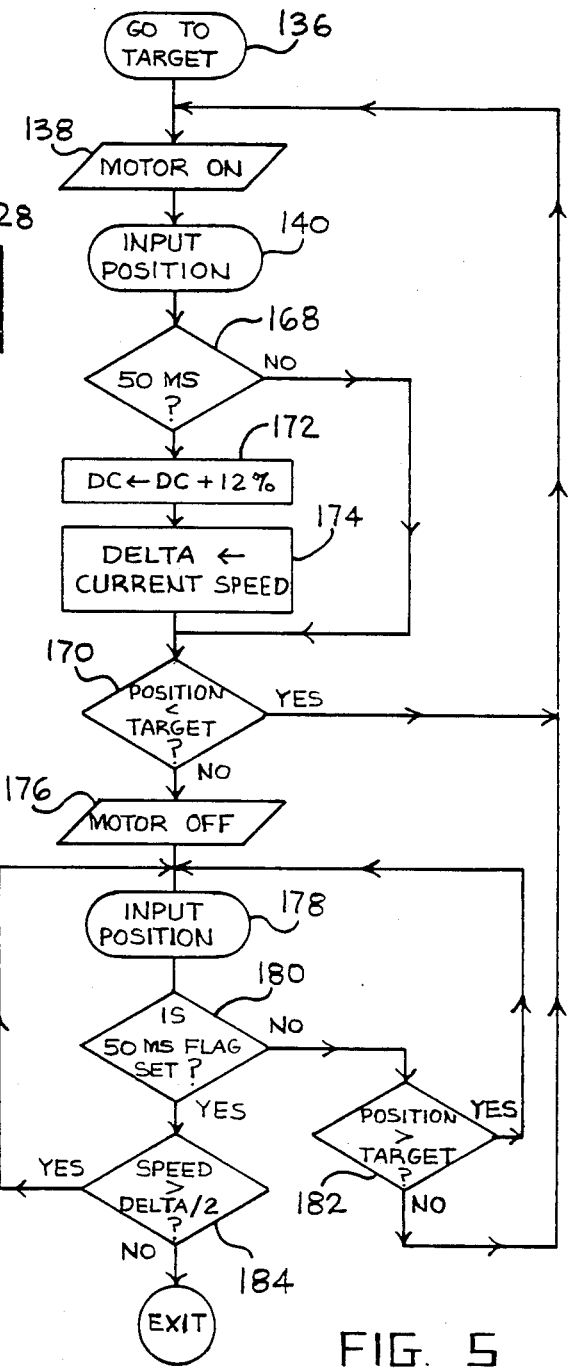

The "go to target" block 136 (a "subroutine" block) indicates that the flow chart in FIG. 5 is operative at this point. As shown in that figure, the next step is represented by input/output block 138, which signifies that the motor is turned on. (In the symbols used, the rectangular blocks, called "process" blocks, are used to indicate operations internal to the computer; whereas the parallelogram blocks, called "input/output" blocks, are used to indicate operations requiring interface of the computer with external apparatus.)

Figure 6:
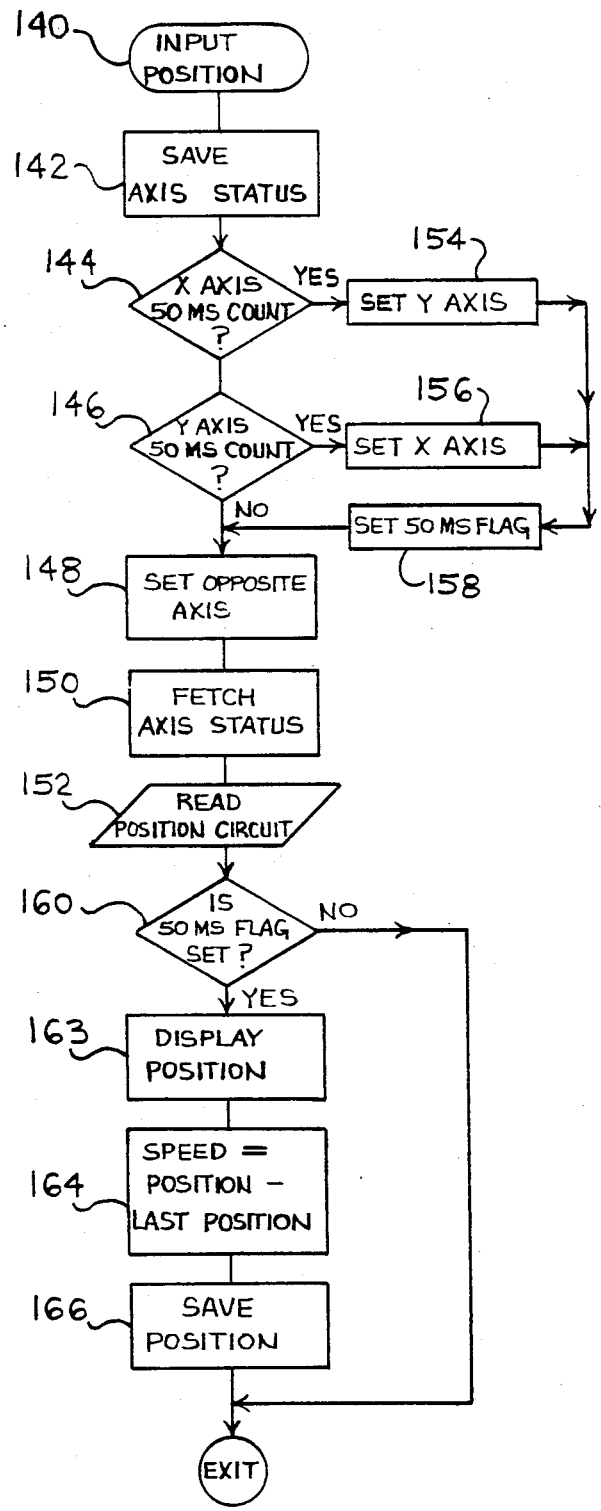

As shown by block 140, titled "input position", the next step is the subroutine shown in FIG. 6. There a process block 142 causes the current status of the functioning axis to be recorded. The next two decision blocks, 144 and 146, ask, respectively, whether the X axis has completed its 50 ms count, and whether the Y axis has completed its 50 ms count. The 50 ms time cycle in each axis is, in effect, a clock for that axis. Conveniently the 50 ms clock of each axis starts halfway through the 50 ms clock of the other axis, i.e., 25 ms into the cyclical counting of the other axis. The status interrogation of the X and Y axes is, in effect, controlled by the equivalent of a "toggle switch," which alternatively stores the data from one axis while it checks the status of the other axis, and then reverses the relationship. A 50 ms flag on either axis means that that axis has just completed one of its 50 ms clock periods. At that point priority is given to the axis whose flag has just been set. Approximately 10-15 ms of the available 25 ms on each axis is generally unused.

As shown in FIG. 6, process block 148 sets the axis opposite to the one whose status was "saved" at block 142. Then process block 150 causes fetching of the status previously saved from the axis being checked prior to the last switching. Input/output block 152 causes reading of the current position of the driven element.

If the answer at block 144 is "yes", the other axis, the Y axis, is set at process block 154, in order that process block 148 will revert to the X axis, which is entitled to priority because its 50 ms count has just been completed. If the answer at block 146 is "yes", the other axis, the X axis, is set at process block 156, in order that process block 148 will revert to the Y axis, which is entitled to priority because of its 50 ms count has just been completed. If either of blocks 144 or 146 provides a "yes" answer, the 50 ms flag is set at process block 158.

After the current driven element position is read at block 152, decision block 160 asks if the 50 ms flag has been set. If not, the process flows to exit. If it has been set, process block 163 causes position to be displayed, process block 164 calculates speed as equal to the difference between the position at the beginning and the position at the end of the just completed 50 ms clock for the axis in question. Then the current position is "saved" in process block 166.

Proceeding from the input position subroutine block 140 in FIG. 5, the process moves to decision block 168, which determines whether to 50 ms clock has been completed. If not, the next step is decision block 170, which inquires whether current position is less than target. If the answer if "yes", the process loops back to the top of the subroutine, specifically to input/output block 138 which causes the motor to continue to run. A "yes" answer at decision block 168 leads to process block 172 which adds 12% to the duty cycle. This process block is only relevant during the second phase of the destination approach. Since the first phase is always operated at a duty cycle of substantially 100%, it is not subject to increase. The next process block 174 sets the value of "delta" at the current speed, i.e., the speed indicated by the distance traveled during the most recent 50 ms clock period for the axis in question. The value of delta is a temporarily stored value which will be used later in determining whether a "fast stop" has occurred. After process block 174, decision block 170 asks whether the position is short of the target, and as long as the answer remains "yes", the routine loops back to input/output block 138 to keep the motor running.

Once the current position reaches the target, the motor is turned off at input/output block 176. Then the input position subroutine is called for by block 178, which causes a repeat of the subroutine shown in FIG. 6. At decision block 180, the question is asked whether the 50 ms flag has been set. If the answer is "no", the next block is decision block 182, which asks if the current position exceeds (i.e., has passed) the target. If "yes", the flow loops back to the input position subroutine. If "no", the indication is that the driven element has "slipped back", a fairly common occurrence. Therefore, the flow loops back to the top of the figure, turning the motor on at input/output block 138. If block 180 indicates that the 50 ms flag has been set, decision block 184 determines whether current speed (as determined during the 50 ms clock period) is greater than one-half the value of delta, which was set in process block 174. As long as the answer is "yes", the process loops back through blocks 178 and 180. When the answer at decision block 184 is "no", indicating that current speed is no greater than one-half delta, a "fast stop" is deemed to have occurred, and the process flow exits from the "go to target" subroutine.

Referring again to FIG. 3, the next step after the subroutine block 136 is the decision block 186, which asks whether overshoot has occurred, i.e., has the driven element passed its destination? Since the target in the revaluation run was set to equal the destination, overshoot is inevitable on the first run. So a "hard stop" will be called for at subroutine block 188.

Figure 7:
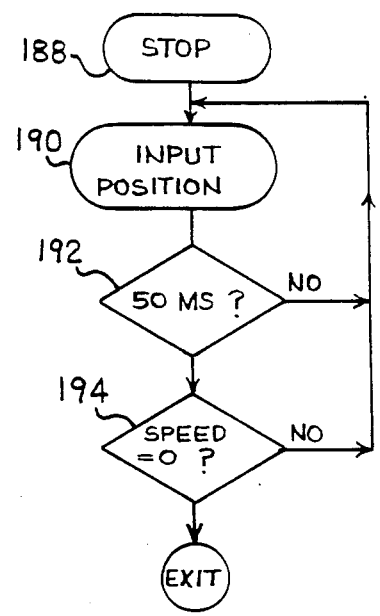

The "hard stop" subroutine is shown in FIG. 7, which is headed by the subroutine block 188. (It should be noted that the last block in FIG. 4 also calls for the "hard stop" subroutine). An input/output block 190 (in FIG. 7) the input position subroutine is called for. Then decision block 192 determines whether the 50 ms clock period has ended. If not, the process continues to input position and then check the clock. When the 50 ms clock has ended, decision block 194 determines whether the speed is zero. If not, the process loop of blocks 190, 192 and 194 is repeated. When the answer at block 194 is "yes", a "hard stop" is deemed to have occurred, and the subroutine is exited.

Referring again to FIG. 3, after the hard stop at block 188, the process block 196 sets the "fast coast" value equal to the current position minus the target. This value represents the coasting distance of the motor after it was turned off, which, after the revaluation run, equals the distance by which it has overshot the destination. The fast coast value, which was previously set for the revaluation run as zero, is, therefore, changed at process block 196, because it is set to equal the coasting distance of the motor after turn off. The new value is stored in the computer, so that future runs of the first (fast speed) approach phase will use the new value. Therefore, in future runs, the target set at process block 122, which equals destination minus 1.5 times fast coast, will not permit overshoot unless operating conditions of the apparatus change significantly. This is true because the target set at block 122 will be short of the destination by 150% of the coasting distance of the driven element after motor turn off. Should another overshoot occur during the first phase, after revaluation, the fast coast value set at block 196 will not represent overshoot coasting, but will represent coasting after reaching the target, which was set substantially short of the destination at block 122.

As previously stated, after each overshoot, the motor will be automatically put into reverse to return the driven element to the approach side of its destination. Since the motor, during this return movement, will probably not reach a very high speed (due to inertia), the driven element probably will stop on the approach side substantially closer to destination than 150% of the fast coast value. Therefore, the position at decision block 132 will be greater than the target, and the "yes" branch will bring the sequence to process block 198, which sets the next target as one-fourth of the remaining distance to destination (destination minus position). This concept will be recognized as similar to that disclosed in U.S. Pat. No. 4,312,033, which has been called the "proportional" destination approach concept. This is the second phase of the three phase destination approach procedure.

In the next process block 200, the duty cycle is given that value which has been termed the "slow duty cycle" value. During the revaluation sequence, this value is set at process block 128 (FIG. 4) as 67%, which is a relatively high value, designed to cause intentional overshoot. The duty cycle concept, as explained above, provides for varying the ratio of on time pulsing to off time pulsing of the motor, in order to vary the motor speed, and thus vary the distance traversed during a given period of time. After process block 200, the "go to target" subroutine is called for by block 202. Assuming there is an overshoot, because revaluation is occurring, the answer at decision block 204 will be "yes". This leads to process block 206, which changes the "slow duty cycle" value, reducing it by approximately 3%. This reduced value is stored in the computer for use on the next (and future) runs of the apparatus. After block 206, the process loops back to the top to the figure at block 110. Experience has indicated that the second, "proportional", phase of the approach procedure will usually overshoot many times during revaluation, reducing the slow duty cycle by 3% each time it overshoots. The lowest value reached, which may eventually be in the range of 25% to 50%, will remain in the computer for future runs. It will be reduced again by approximately 3% if there is another overshoot, at any time, in the second approach phase. If, for some reason, the interim target in the "proportional" phase is not reached during a 50 ms clock period, the duty cycle will be increased by one-eighth (approximately 12%) at block 172, and this "ramping up" will continue to occur after each 50 ms period until the interim target is reached. On the next increment, i.e., movement to the next interim target set at block 198, which is one-fourth of the remaining distance to destination, the duty cycle will again be set at block 200 at the lower "slow duty cycle" value stored in the computer.

The third, and final, approach phase, which involves the "nudging" concept disclosed in U.S. Pat. No. 4,353,019, begins whenever the answer at process block 120 is "yes", indicating that the driven element is less than 0.002 inch from destination. During revaluation, the final phase may start, on the first destination-finding sequence, before the second phase has reduced its duty cycle to a non-overshoot value. This is true because of the various positions which can be reached after correction of an overshoot (by reverse motion). When the answer at block 120 is "yes", process block 208 sets the interim target equal to the current position, and process block 210 sets the duty cycle to equal the "pulse duty cycle" value present in the computer. As explained in the earlier applications identified above, the interim target during each cycle of the "nudging" phase could be slightly different from the current position, if desired, but generally using the current position as the interim target is the simplest practice. For revaluation purposes, the initial value of the "pulse duty cycle" will be 67%, as indicated by process block 128 (FIG. 4). This value has also been chosen to cause intentional overshoot.

Next, at input/output block 212, the motor is turned on, and it remains on for a predetermined period of 5 ms, as indicated by the 5 ms delay at process block 214, and by the "motor off" signal at input/output block 216. The reasons for selecting an on window of 5 ms out of 50 ms (the clock period of the motor cycle) were discussed in application Ser. No. 289,922. After motor turn off at block 216, the "input position" subroutine is called for at block 218, and then decision block 220 determines whether the 50 ms clock period has ended. In other words, the motor is off for 45 ms. As long as the answer at block 220 is "no", the looping of blocks 218 and 220 continues. When the answer is "yes", because the 50 ms clock period has ended, it is determined at decision block 222 whether the current position is greater than the target. In other words, has the driven element moved toward the destination? Since the initial setting of the pulse duty cycle at approximately 67%, for revaluation purposes, is intended to cause overshoot, the answer at both decision block 222 and decision block 224 should be "yes" on the initial revaluation run. The "yes" at the overshoot decision block 224 will cause process block 226 to lower the pulse duty cycle value by 3%, i.e., change it from approximately 67% to approximately 64%. This new value will be stored in the computer to control future runs, as will each further 3% reduction of the pulse duty cycle caused by overshoot at any time during the final "pulsing", or "nudging", phase of destination approach. Overshoot usually occurs several times during this final approach phase. (The computer-stored value will not be able to increase until another revaluation process is initiated by the operator.) As with the second phase, the final computer-stored "pulse duty cycle" may eventually fall in the range of 25% to 50%. After block 226, the process loops back to the top of the chart.

If, during a normal (non-revaluation) run of the apparatus, the answer at block 222 is "no", indicating that the driven element has not moved forward, the effect of process block 228 is to initiate a "nudging" cycle by incrementally increasing the pulse duty cycle, using an incremental increase value of approximately 6%. After each such increase, the process loops back to block 212 causing the motor to turn on; then blocks 214 and 216 provide a 5 ms "on window" followed by a 45 ms off period, as before. It may seem paradoxical that a "pulse duty cycle", which has been "ramped down" to prevent overshoot, may thereafter have to be "ramped up" during one or more "nudging" cycles in order to cause detectible forward motion. However, variations in operating conditions can require many combinations of pulsing values. If, during the nudging cycle, the first 6% duty cycle increase at block 228 does not cause forward motion, a second 6% duty cycle increase will be added at block 228; and this process will continue until forward motion occurs, i.e., until the answer at block 222 is "yes". Once such motion has occurred, a new interim target (the current position) will be set at block 208 and the next "pulsing duty cycle" value set at block 210 (if destination has not been reached) will again start at the lower end of the nudging cycle, using the value which has been stored in the computer as a result of the downward value adjustments made at process block 226. If there is no forward motion using the stored lower value, the nudging cycle will again be followed, using the 6% increment of "pulse duty cycle" increase provided by process block 228.

From the foregoing description, it will be apparent that the apparatus and method disclosed in this application will provide the significant functional benefits summarized in the introductory portion of the specification. A possible modified version of the invention is a destination-approach system which would permit reaching destination from either direction. This would be feasible if a driven element position-measuring means were used which would not be subject to the backlash problem involved in lead screw measurement. Such a position-measuring means, e.g., a linear scale, would focus directly on the position of the driven element itself. In adapting the present invention to such a dual-direction approach system, overshoot would be deemed to occur if the destination were passed going in either direction; and the correction would apply to destination approach from either direction.

The following claims are intended not only to cover the specific embodiments disclosed, but also to cover the inventive concepts explained herein with the maximum breadth and comprehensiveness permitted by the prior art.

I claim:

1. In a destination-finding apparatus which moves a driven element until it reaches the desired destination and subsequently moves the driven element to the same or different desired destinations, the apparatus including a motor for causing the driven element to approach the presently desired destination, and means for measuring the position of the driven element and determining whether it has overshot the presently desired destination; a control system comprising:
   means for establishing a control valve for the motor;
   means for actuating the motor in accordance with the control value;
   means for setting the initial value to cause intentional overshoot of the driven element past the presently desired destination;
   means, operative each time the driven element overshoots the presently desired destination, for automatically changing the control value in such a way as to make future overshoot less likely; and
   means for retaining the changed control value as the motor control value for subsequent destination-finding movements of the driven element both to its presently desired destination and to subsequent desired destinations.

2. The apparatus of claim 1 wherein the motor control value which is initially set and then automatically changed is a distance value representing driven element travel.

3. The apparatus of claim 1 wherein the motor control value which is initially set and then automatically changed is the amount of energy initially applied to the motor, which is automatically reduced after overshoot.

4. The apparatus of claim 1 which also comprises:
   a first phase motor control means for moving the driven element from its initial position toward a preselected destination at a relatively fast speed by applying thereto substantially continuous and constant energy;
   a subsequent phase motor control means for moving the driven element toward the same preselected destination at a relatively slow speed by varying the amount of energy applied to the motor in order to move the driven element to a series of successive interim targets between the initial position and the preselected destination; and means for selecting each successive interim target automatically in response to the position of the driven element after the previous target has been attained.

5. The apparatus of claim 4 wherein the motor control value of the first phase motor control means is a distance value representing driven element travel.

6. The apparatus of claim 4 wherein the motor control value of the subsequent phase motor control means is the amount of energy initially applied to the motor, which is automatically reduced after overshoot.

7. The apparatus of claim 5 wherein the motor control value of the subsequent phase motor control means is the amount of energy initially applied to the motor, which is automatically reduced after overshoot.

8. The apparatus of claim 4 wherein the subsequent phase motor control means sets a series of interim target positions for the driven element, each such target position being at a distance from the then current driven element position which distance is calculated as a fraction of the remaining distance to destination.

9. The apparatus of claim 4 wherein the subsequent phase motor control means sets a series of interim target positions for the driven element, each such target position being at substantially the then current position of the driven element, thereby setting a new interim target each time the driven element moves toward the destination.

10. The apparatus of claim 8 wherein:
the motor control value of the first phase motor control means is a distance value representing the travel of the driven element, and
the motor control value of the subsequent phase motor control means is the amount of energy initially applied to the motor which is automatically reduced after overshoot.

11. The apparatus of claim 9 wherein:
the motor control value of the first phase motor control means is a distance value representing the travel of the driven element, and
the motor control value of the subsequent phase motor control means is the amount of energy initially applied to the motor which automatically reduced after overshoot.

12. The apparatus of claim 3 which also comprises:
means for setting a series of interim target positions for the driven element, each such target position being at a distance from the then current driven element position which is calculated as a fraction of the remaining distance to destination; and
means, operative during each such series of interim target positions, for increasing the motor duty cycle value if the interim target is not reached in a predetermined time, without altering the previously reduced initial motor duty cycle value for any subsequent series of interim target positions.

13. The apparatus of claim 3 which also comprises:
means for setting a series of interim target positions for the driven element, each such target position being at substantially the then current position of the driven element, thereby setting a new interim target each time the driven element moves toward the destination; and
means, operative during each such series of interim target positions, for increasing the motor duty cycle value if the interim target is not passed in a predetermined time, without altering the previously reduced initial motor duty cycle value for any subsequent series of interim target positions.

14. The apparatus of claim 13 which also comprises:
means for dividing the time into a motor on window period and a motor off period having predetermined repetitive lengths.

15. The apparatus of claim 4 wherein the subsequent phase motor control means comprises:
a second phase motor control means which sets a series of interim target positions for the driven element, each such target position being at a distance from the then current driven element position which is calculated as a fraction of the remaining distance to destination; and
a third phase motor control means which sets a series of interim target positions for the driven element, each such target position being at substantially the then current position of the driven element, thereby setting a new interim target each time the driven element moves toward the destination.

16. The apparatus of claim 15 wherein:
the motor control value of the first phase motor control means is a distance value;
the motor control value of the second phase motor control means is a motor duty cycle value; and
the motor control value of the third phase motor control means is a motor duty cycle value.

17. A control method for a driven-element-positioning apparatus which includes a motor for causing the driven element to approach its presently desired destination and subsequent desired destination, and means for measuring the position of the driven element and determining whether it has overshot the presently desired destination, such method comprising the following steps;
establishing a control value for the motor;
actuating the motor in accordance with the control value;
setting the initial control value to cause intentional overshoot of the driven element past the presently desired destination;
automatically changing the control value each time the driven element overshoots the presently desired destination; and
retaining the changed control value as the motor control value for destination-approach movements of the driven element both to its presently desired destination and to subsequent desired destinations.

18. The method of claim 17 wherein the motor control value which is initially set and then changed is a distance value representing driven element travel.

19. The method of claim 17 wherein the motor control value which is initially set and then changed is the amount of energy initially applied to the motor, which is automatically reduced after overshoot.

20. The method of claim 17 which includes the steps of:
moving the driven element toward the destination with a relatively fast speed phase wherein the motor control value is a distance value; and
thereafter moving the driven element toward the destination with a relatively slow speed phase wherein the motor control value is a motor duty cycle value.

21. The method of claim 20 which also comprises:
setting a series of interim target positions for the driven element during the slow speed phase, each of which target positions is at a distance from the then current position of the driven element which is calculated as a fraction of the remaining distance to destination.

22. The method of claim 20 which also comprises: setting a series of interim target positions for the driven element during the slow speed phase, each of which target positions is at substantially the then current position of the driven element, thereby setting a new interim target each time the driven element moves toward the destination.

23. The apparatus of claim 3 wherein the amount of energy applied to the motor is determined by the motor duty cycle.

24. The apparatus of claim 6 wherein the amount of energy applied to the motor is determined by the motor duty cycle.

25. The apparatus of claim 7 wherein the amount of energy applied to the motor is determined by the motor duty cycle.

26. The apparatus of claim 10 wherein the amount of energy applied to the motor is determined by the motor duty cycle.

27. The apparatus of claim 11 wherein the amount of energy applied to the motor is determined by the motor duty cycle.

28. The apparatus of claim 1 which also comprises: operator-controlled re-setting means for which provides the only means for re-establishing the motor control value which causes intentional overshoot, thereby repeating the control value changing cycle at the operator's discretion.

29. The method of claim 17 which also comprises: re-setting only by the operator of the motor control value which causes intentional overshoot, thereby repeating the control value changing cycle at the operator's discretion.

30. For use with a positioning system for moving a driven element in response to command signal pulses precisely to a presently desired destination and also to subsequent desired destinations, which system includes (a) a motor which exerts moving force on the driven element whenever the motor is on, and which is on when the command signal is present and off when the command signal is absent; and (b) means for measuring the position of the driven element and comparing it to the presently desired destination; that method of controlling the motor which comprises the following steps:
setting an initial distance of driven element travel which is sufficient to cause the latter to overshoot the presently desired destination;
turning off the motor after the initially set distance has been traveled, and permitting the driven element to coast to a stop;
measuring the distance by which the driven element has overshot the presently desired destination;
determining a new, shorter distance of driven element travel which depends on the distance of overshoot;
storing the new, shorter distance for future use as the initial travel distance toward subsequent desired destinations;
determining another new, shorter travel distance if any stored initial travel distance causes the driven element to overshoot the then desired destination; and
storing the latest new, shorter travel distance for future use as the initial travel distance toward subsequent desired dedstinations.

31. For use with a positioning system for moving a driven element in response to command signal pulses precisely to a presently desired destination and also to subsequent desired destinations, which system includes (a) a motor which exerts moving force on the driven element whenever the motor is on, and which is on when the command signal is absent; and (b) means for measuring the position of the driven element and comparing it to the presently desired destination; that method of controlling the motor which comprises the following steps:
establishing an alternation of motor on and motor off periods;
causing a cycle of interim target positions short of the presently desired destination to which the motor is to move the driven element;
establishing an initial value of driving energy applied to the motor during its on periods, which value is normally sufficient to cause the driven element to overshoot the presently desired destination after one of its on periods;
reducing by an incremental amount the initial value of driving energy applied to the motor during its on periods after each instance in which the driven element overshoots the presently desired destination;
storing the new, reduced initial driving energy value for future use as the initial motor driving energy value toward subsequent desired destinations; and
if the driven element overshoots the then desired destination during any future cycle of such interim target positions, establishing another new, incrementally reduced value of initial motor driving energy, and storing the latest new value for future use as the initial motor driving energy value toward subsequent desired destinations.

32. For use with a positioning system for moving a driven element precisely to a destination in response to command signal pulses, which system includes (a) a motor which exerts moving force on the driven element whenever the motor is on, and which is on when the command signal is present and off when the command signal is absent; and (b) means for measuring the position of the driven element and comparing it to the destination; that method of controlling the motor which comprises the following steps:
establishing an alternation of motor on and motor off periods;
setting an interim position goal for movement of the driven element by the motor;
establishing a first value of driving energy applied to the motor during its on periods;
applying the first value of driving energy to the motor;
determining whether the interim position goal has been attained;
if the interim position goal has not been attained, increasing the value of the driving energy by an incremental amount to constitute a second value;
applying the second value of driving energy to the motor;
continuing a series of incremental increases in the value of driving energy until the interim position goal has been attained;
initially setting the first value of driving energy at a level which is normally sufficient to cause the driven element to overshoot the destination;

if overshoot does occur, reducing by an incremental amount the first driving energy value of the series of incremental increases;

storing the reduced first driving energy value for future use as the first value of each series;

setting a new interim position goal for movement of the driven element by the motor;

using the new, reduced first driving energy value to begin another series of incremental driving energy value increases until the new interim position goal has been attained; and if the driven element is caused to overshoot the destination by the first driving energy value of any series, reducing by a further incremental amount the first driving energy value of the series, and storing the latest new first driving energy value of the series for future use in that function.

33. For use with a positioning system for moving a driven element precisely to a destination in response to command signal pulses, which system includes (a) a motor which exerts moving force on the driven element whenever the motor is on, and which is on when the command signal is present and off when the command signal is absent; and (b) means for measuring the position of the driven element and comparing it to the destination; that method of controlling the motor which comprises the following steps:

using equal successive clocked periods to provide consistent timing intervals;

determining the distance traveled by the driven element during each successive timing interval, thereby providing a speed of travel measurement;

causing the motor to turn off at certain target positions of the driven element;

allowing the driven element to reach a desired reduced speed after each motor turn off, before initiating a subsequent control signal; and determining that the driven element has reached the desired reduced speed when the distance traveled by it during one of the successive timing intervals is at or below a predetermined fraction of the distance traveled by it during the earlier timing interval when the motor was turned off.

34. For use with a positioning system for moving a driven element precisely to a destination in response to command signal pulses, which system includes (a) a motor which exerts moving force on the driven element whenever the motor is on, and which is on when the command signal is present and off when the command signal is absent; and (b) means for measuring the position of the driven element and comparing it to the destination; an apparatus comprising:

means for using equal successive clocked periods to provide consistent timing intervals;

means for determining the distance traveled by the driven element during each successive timing interval, thereby providing a speed of travel measurement;

means for causing the motor to turn off at certain target positions of the driven element;

means for allowing the driven element to reach a desired reduced speed after each motor turn off, before initiating a subsequent control signal; and means for determining that the driven element has reached the desired reduced speed when the distance traveled by it during one of the successive timing intervals is at or below a predetermined fraction of the distance traveled by it during the earlier timing interval when the motor was turned off.

* * * * *

UNITED STATES PATENT AND TRADEMARK OFFICE
CERTIFICATE OF CORRECTION

PATENT NO. : 4,810,946
DATED : March 7, 1989
INVENTOR(S) : James S. Sweeney, Jr.

It is certified that error appears in the above-identified patent and that said Letters Patent is hereby corrected as shown below:

Column 3, line 24: After "2", insert -- is --
Column 4, line 63: Change "of" to -- if --
Column 5, line 40: After "applied", insert -- during --
Column 7, line 18: Change "is" to -- in --
Column 11, line 27: Change "An" to -- At --
Column 14, line 33: Change "valve" to -- value --
Column 15, line 36: After "motor", insert a comma'
Column 15, line 44: Delete "which", and insert instead -- , which is --
Column 15, line 46: Change "3" to -- 23 --
Column 15, line 58: Change "3" to -- 23 --
Column 16, line 31: Change "destination" to -- destinations --
Column 16, line 58: Delete "the", second occurrence, and insert instead -- a preselected --
Column 16, line 62: Before "destination", insert -- same preselested --

UNITED STATES PATENT AND TRADEMARK OFFICE
CERTIFICATE OF CORRECTION

PATENT NO. : 4,810,946

DATED : March 7, 1989

INVENTOR(S) : James S. Sweeney, Jr.

It is certified that error appears in the above-identified patent and that said Letters Patent is hereby corrected as shown below:

Column 17, line 27: Delete "for".

Signed and Sealed this

Twenty-fourth Day of April, 1990

Attest:

HARRY F. MANBECK, JR.

*Attesting Officer*  *Commissioner of Patents and Trademarks*